Figure 1:
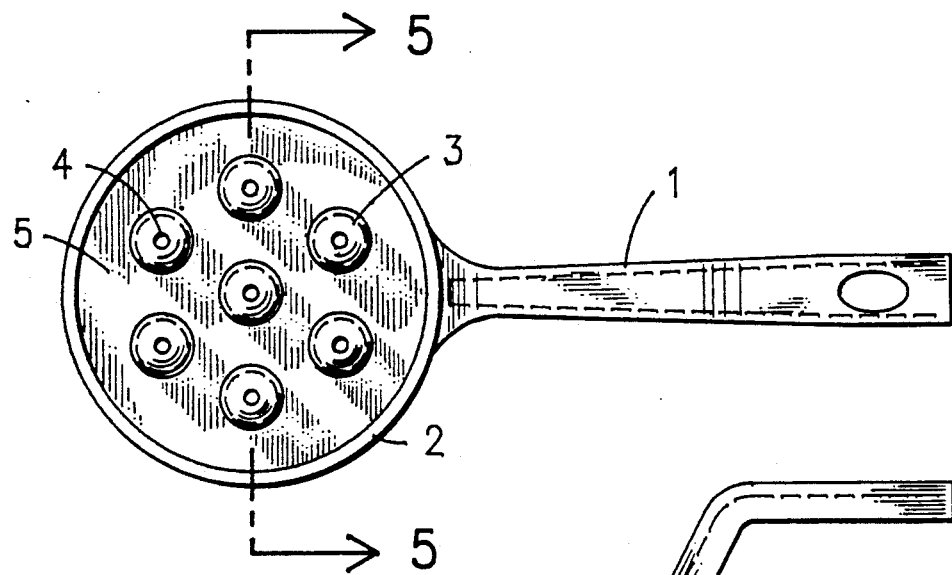

United States Patent

Keene

[11] Patent Number: 5,084,177
[45] Date of Patent: Jan. 28, 1992

[54] OIL SKIMMER

[76] Inventor: Wallace C. Keene, 555 3rd St. North, St. Petersburg, Fla. 33701

[21] Appl. No.: 421,793

[22] Filed: Oct. 16, 1989

Related U.S. Application Data

[63] Continuation-in-part of Ser. No. 380,286, Jul. 17, 1989, abandoned.

[51] Int. Cl.$^5$ .................................................. C02F 1/40
[52] U.S. Cl. .................................. 210/470; 210/498; 210/514; 99/495; 99/496; 99/508; 30/325
[58] Field of Search ............... 210/238, 470, 498, 513, 210/514; 99/495, 496, 506, 508; 30/324, 325, 326; 220/66

[56] References Cited

U.S. PATENT DOCUMENTS

| D. 210,399 | 3/1968 | Wichmann | 210/470 |
| 858,291 | 6/1907 | Irby | 210/470 |
| 1,306,415 | 6/1919 | Dunlop | 210/498 |
| 1,341,187 | 5/1920 | McPhetters | 210/498 |
| 1,889,543 | 11/1932 | Coors | 210/498 |
| 2,575,768 | 11/1951 | Pearsall | 210/513 |
| 2,795,119 | 6/1957 | Bair | 30/325 |
| 3,326,384 | 6/1967 | Wessels | 210/470 |
| 3,392,845 | 7/1968 | Shapiro et al. | 210/470 |

Primary Examiner—Richard V. Fisher
Assistant Examiner—Christopher Upton
Attorney, Agent, or Firm—Walter J. Monacelli

[57] ABSTRACT

The device described herein comprises a ladle type utensil having a handle attached to a substantially cylindrical cup having a bottom comprising either a flat or preferably a concave bottom in which a number of "domes" are set, which "domes" extend upward from the bottom of the said cup. Each dome has an opening at the crest thereof, which dome openings provide the only means for liquid to flow from beneath the cup into the interior of the cup. In the preferred modification there are seven of said domes, one being positioned in the center of the cup bottom and the others being arranged in a cricle around the central dome.

22 Claims, 2 Drawing Sheets

OIL SKIMMER

This application is a continuation in-part of application Ser. No. 07/380,286, filed July 17, 1989, now abandoned.

BACKGROUND OF THE INVENTION

1. Field of the Invention

This invention relates to a device for skimming oil off the surface of an aqueous liquid. More specifically this invention relates to such a device designed to remove thin layers of oils and fats which collect on the surface of soups, broths, stews, etc., while they are being cooked or even afterwards. Still more specifically it relates to a type of ladel having a cylindrical cup shape which when pressed down on the surface of the liquid causes the oil on the surface to come into the interior of the cup through openings in the bottom of this cup. Still more specifically these openings are at the crest of a number of domes which rise from the bottom of this cup.

2. State of the Prior Art

Various inventions have been aimed at solving this problem. These are cumbersome and complicated.

In 1907, U.S. Pat. No. 858,291 was granted on a device having a number of sloping surfaces which when pressed on the liquid caused the oil to rise to escape through openings at the top edges of these sloping surfaces.

In 1967, U.S. Pat. No. 3,326,384 was issued on a device having an elaborate system of sloping surfaces which when pressed down on the liquid caused the oil to rise and escape through open slots at the tops of these sloping surfaces.

In 1968, Design U.S. Pat. No. 210,399 was granted on a soup skimmer in which a conically shaped bottom of a pan had one opening at the crest of the cone through which oil escaped into the pan. With this one opening the pan has to be moved around on the surface of the liquid to trap the oil.

None of these are very efficient which is evidenced by the lack of commercial success encountered by these devices.

SUMMARY OF THE INVENTION

In accordance with the present invention an oil skimmer has been designed which very effectively and efficiently removes oil from the surface of an aqueous liquid such as soups, stews, etc. This skimmer resembles a ladle in that it has a cup at the end of a handle, with handle attached at an appropriate angle for applying the bottom of the cup onto the surface of the liquid. This cup is advantageously of generally cylindrical outer configuration with the bottom either flat or preferably concave with an outer edge of the cylindrical surface preferably extending a short distance below the bottom of the cup so as to form a rim which will entrap oil beneath the cup as it is pressed down on the liquid surface. The bottom of the cup is sealed except for the number of openings specifically described herein. From the flat or concave bottom there are a number of "domes", preferably 7, which extend upward into the interior of the cup. Each dome includes a small hollow hemisphere with an opening at the crest of the hemisphere. The dome may comprise the hemisphere by itself or may be raised to greater height by having a small hollow cylinder inserted between the bottom of the hemisphere and the bottom of the cup. The small hollow cylinder has the same inside diameter as the hemisphere. In each case where such a cylinder is used the bottom edge of the small cylinder is sealed to the bottom of the cup and the small hemisphere is sealed to the top edge of the small cylinder. These openings at the crests of the hemispheres are the only means of flow or communication between the exterior of the bottom of the cup and the interior of the cup.

When this cup is placed on the surface of the liquid, the oil in the area under the cup is trapped by the above-mentioned rim below the cup. Then as the cup is pressed gradually on the liquid, the oil rises in the individual "domes" and escapes through the openings in the crests thereof into the interior of the cup. The height of the small hemispheres with or without the additional height of the small cylinders provides a well into which considerable oil may be collected in the cup before it becomes desirable to remove the cup and empty the collected oil.

SPECIFIC DESCRIPTION OF THE INVENTION

In a preferred modification of the skimmer of this invention, the handle is advantageously fastened to the cup at an angle of about 27° with the vertical or about 63° from the horizontal. Such an angle allows easy manipulation into kettles or pots.

It has been found that the greatest efficiency in oil skimming may be effected with a cup having seven "domes" with one dome being positioned at the center of the cup bottom and six domes arranged in a circle around the central dome. This gives a spacing of 60 degrees between adjacent domes in the circular arrangement.

For use in ordinary cooking the cup advantageously has an inside diameter of 3–4 inches, preferably 3.5 inches, and a depth or height of the cylindrical wall advantageously of 1–2 inches, preferably 1.5 inches. Obviously the height or depth of this cylindrical wall can vary substantially and it is preferably higher than the well provided by the height of the domes within the cup. The domes advantageously have a height of 7/16" to ¾ inch, preferably about ⅝ inch, an inside diameter of ¾ to 1 inch preferably about ⅞ inch, and the holes in the crest of the domes have a diameter of 1/16 to ⅛, preferably 3/32 inch.

With this preferred modification in the dimensions described it has been found possible to remove oil to an efficiency of 97.8 percent. This is shown by mixing 4 ounces of an oil with a quart of water. Then by using this device it is possible to recover 3.4 ounces with one dip of this device. By repeating this process the recovery can be increased to 97.8 percent.

For the above size cup seven domes appear to be the optimum number. A smaller number of domes gives poor efficiency in oil recovery. A larger number such as 9 requires that the domes be smaller with resultant reduced efficiency.

In some cases, such as for commercial sized equipment, it might be desirable to use a larger cup and thereby be able to accommodate a larger number of the type and size domes as described above. However even with larger sized kettles or pots the oil generally comes to the center of the top surface so that the preferred size device described above is used very effectively. If the oil has not collected at the center, the skimmer can be moved to different areas where the oil has collected.

Attempts to use cones instead of the "domes" described herein result in collection of considerable amounts of solids with the oil.

To facilitate description of the device of this invention, reference is made to the accompanying drawings.

FIG. 1 is a top view showing the handle 1 attached to the cylindrical cup 2 which advantageously is a clear transparent plastic. Positioned inside the cup are seven domes 3, one in the center and six positioned around the center dome. Each dome has an opening 4 at its crest and is attached to the bottom 5 of of cup 2 over opening 8(See FIG. 5).

Figure 2:
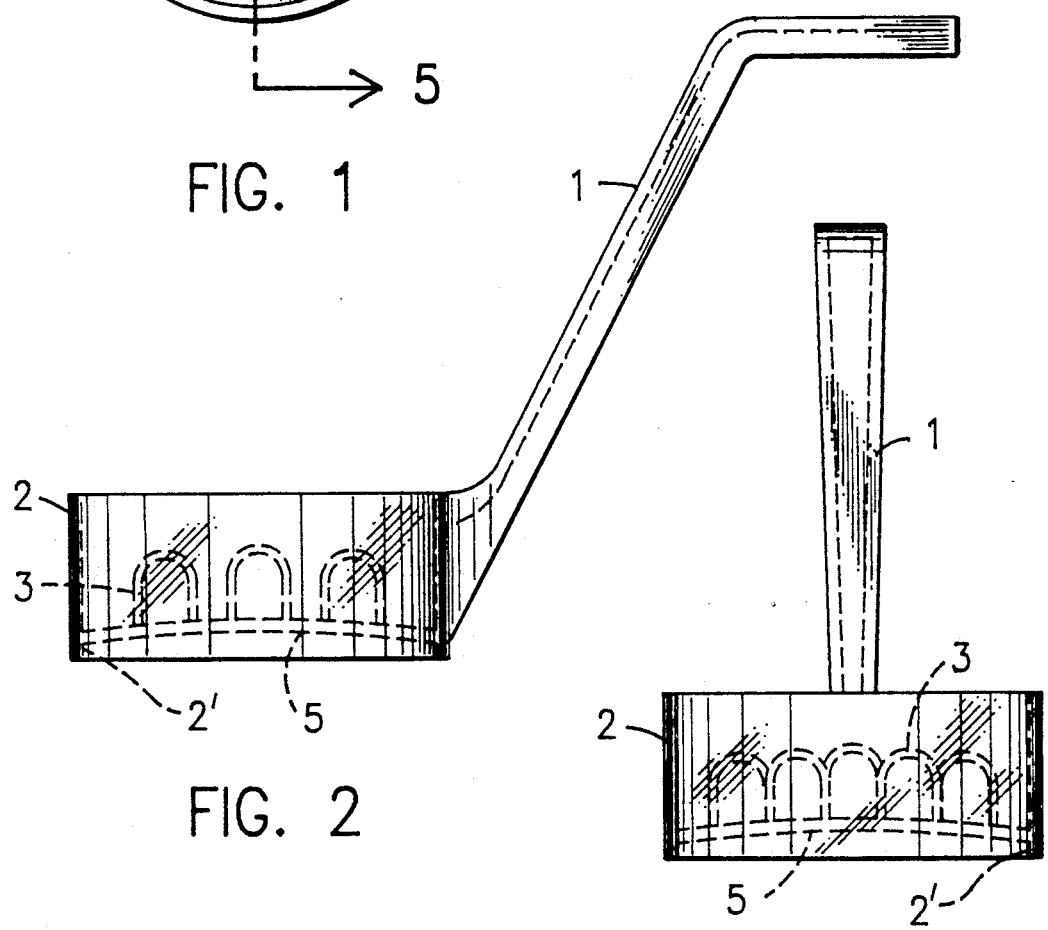

FIG. 2 is a side view which shows the angle of attachment of the handle 1 to the cup 2. The domes 3 are visible through the transparent plastic. Of course if the cup is not transparent, the domes will not be visible in this side view.

Figure 3:
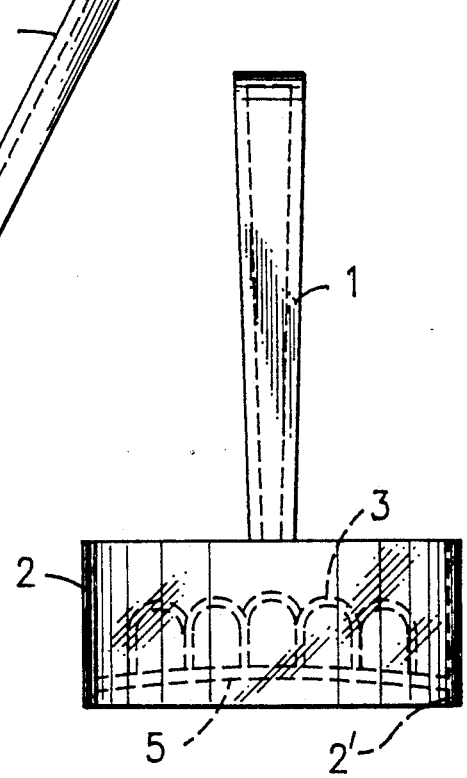

FIG. 3 is a front view of a preferred modification of the skimmer of this invention with concave bottom 5 and the domes 3 visible through the transparent cup 2. The bottoms of domes 3 are sloped to conform to or fit the concave surface.

Figure 4:
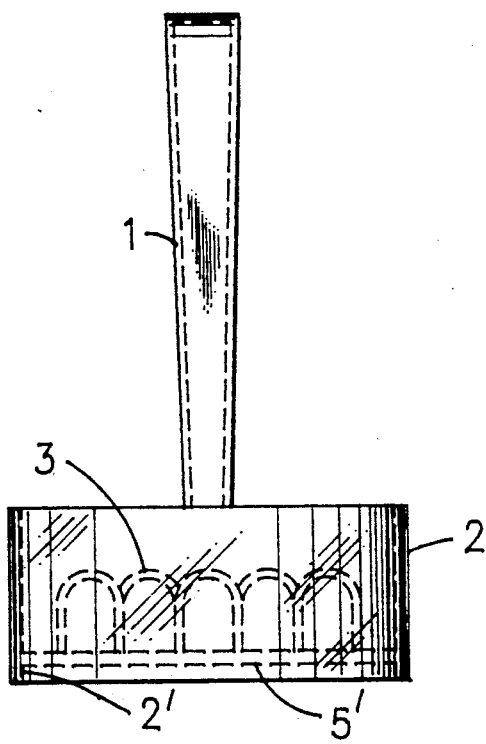

FIG. 4 is a similar front view as in FIG. 3 of a modification of this invention having a flat bottom 5' of the concave bottom shown in FIG. 3.

Figure 5:
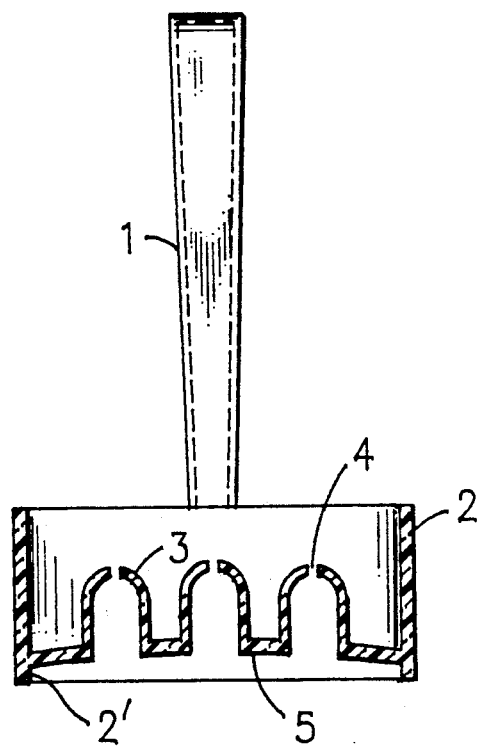

FIG. 5 is a cross-sectional view taken at line 5—5 of FIG. 1. This view shows the preferred concave bottom 5 and rim 2' at the bottom edge of cup wall 2. This concave bottom advantageously has a rise or height at the central portion of about ¼ to ½" preferably about 5/16 inch.

Figure 6:
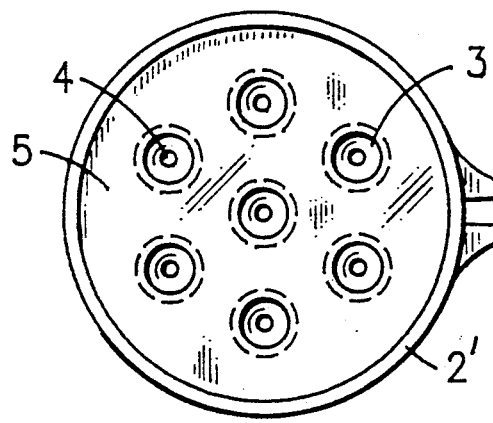

FIG. 6 is a bottom view of the modification of FIG. 1 which shows the rim 2' extending beyond the bottom 5 of the cup 2. This rim advantageously has a depth of about ⅛ to ¼ inch below the bottom of the cup.

Figure 7:
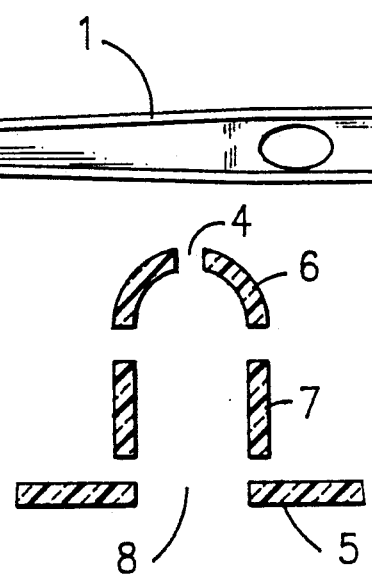

FIG. 7 is a pictorial representation of how a hollow hemisphere 6 is positioned onto small cylinder 7 which in turn is fitted around and over opening 8 in cup bottom 5'. The various parts are joined and sealed together.

While the device of this invention may be assembled from different parts of appropriate shape and size, as illustrated partially by FIG. 7 for example, it is preferred to mold the device as an integral unit such as by injection molding.

The device of this invention may be made of various materials such as metal, wood, plastics, etc. For a number of obvious reasons, such as weight, costs, etc., plastic materials are preferred and for the cup portion at least a transparent plastic is advantageous. When a plastic material is used the device may be molded integrally in one molding operation thereby reducing manufacturing time and costs once the appropriate mold has been obtained. The plastic is advantageously one that can withstand temperatures of at least 350° F.

While certain features of this invention have been described in detail with respect to various embodiments thereof, it will of course be apparent that other modifications can be made within the spirit and scope of this invention and it is not intended to limit the invention to the exact details insofar as they are defined in the following claims.

The invention claimed is:

1. A skimming device suitable for removing oil from the surface of an aqueous liquid comprising:
   (a) a cup having a generally cylindrical outer configuration;
   (b) a cup bottom having a plurality of openings therein;
   (c) a number of domes corresponding in number to the number of said openings in said bottom, each said dome extending upward from said bottom and into the interior of said cup, and each said dome comprising a hollow hemisphere having a crest and having an opening in said crest, the said hollow hemisphere having an inside diameter at least as great as each said opening in said cup bottom and being positioned over one of said cup bottom openings;
   (d) a rim formed by the extension of the cylindrical outer configuration of said cup beyond said bottom; and
   (e) a handle attached to and extending at an upward angle from said cup;

each of the said domes being sealed to said bottom and extending upward therefrom into the interior of said cup so that the only openings between the exterior of said bottom and the interior of said cup are the openings in the said crests of said hemispheres.

2. The skimming device of claim 1 in which there is interposed and sealed between each said hollow hemisphere and said cup bottom a hollow cylinder having an inside diameter corresponding to the inside diameter of said hollow hemisphere.

3. The skimming device of claim 2 in which there are seven of said domes.

4. The skimming device of claim 1 in which said cup has an inside diameter of about 3-4 inches.

5. The skimming device of claim 4 in which said cylindrical outer configuration of said cup has a height of about 1-2 inches.

6. The skimming device of claim 5 in which there are seven said domes positioned over said bottom openings and sealed to the bottom of said cup.

7. The skimming device of claim 5 in which each said dome has an inside diameter of ¾ to 1 inch.

8. The skimming device of claim 7 in which each said dome has a height of about 7/16 to ¾ inch.

9. The skimming device of claim 8 in which the opening in the crest of each said dome has a diameter of about 1/16 to ¼ inch.

10. The skimming device of claim 9 in which the number of said domes is 7.

11. The skimming device of claim 10 in which the said cylindrical outer configuration of the cup extends beyond the said bottom to form a rim having a depth of about ⅛ to ¼ inch.

12. The skimming device of claim 10 in which the bottom of said cup has a concave configuration with the central portion thereof being about ¼ to ½ inch above the outer edge of said bottom.

13. The skimming device of claim 1 in which said cup has an inside diameter of about 3.5 inches.

14. The skimming device of claim 13 in which said cylindrical outer configuration of said cup has a height of about 1.5 inches.

15. The skimming device of claim 14 in which there are seven said domes positioned over said bottom openings and sealed to the bottom of said cup.

16. The skimming device of claim 14 in which each said dome has an inside diameter of about ⅞ inch.

17. The skimming device of claim 16 in which each said dome has a height of about ⅝ inch.

18. The skimming device of claim 17 in which the opening in the crest of each said dome has a diameter of about 3/16 inch.

19. The skimming device of claim 18 in which the number of said domes is 7.

20. The skimming device of claim 1 in which said cup has an inside diameter of about 3.5 inches, the said cylindrical outer configuration of said cup has a height of about 1.5 inches, each said dome has an inside diameter of about ⅜ inch and a height of about ⅝ inch, the opening in the crest of each said dome has a diameter of about 3/16 inch, and the number of said domes is 7.

21. The skimming device of claim 20 in which the said cylindrical outer configuration of the cup extends beyond the said bottom to form a rim having a depth of about ⅛ to ¼ inch.

22. The skimming device of claim 20 in which the bottom of said cup has a concave configuration with the central portion thereof being about ¼ to ½ inch above the outer edge of said bottom.

* * * * *